United States Patent [19]

Wirth

[11] 4,095,740

[45] Jun. 20, 1978

[54] CONDITION RESPONSIVE THERMOSTAT CONTROL APPARATUS

[76] Inventor: Jon C. Wirth, 13116 N. Foxhollow Rd., 118W, Mequon, Wis. 53092

[21] Appl. No.: 784,233

[22] Filed: Apr. 4, 1977

Related U.S. Application Data

[63] Continuation-in-part of Ser. No. 672,747, Apr. 1, 1976, abandoned.

[51] Int. Cl.² ........................................... G05D 23/275
[52] U.S. Cl. ..................................... 236/47; 337/340; 361/173
[58] Field of Search ........................ 236/47, 68 B, 1 R; 337/340; 165/26; 219/502; 361/173

[56] References Cited

U.S. PATENT DOCUMENTS

| | | | |
|---|---|---|---|
| 1,597,773 | 8/1926 | Dodge | 236/1 R X |
| 3,352,490 | 11/1967 | Dalzell et al. | 236/68 B |
| 3,974,426 | 8/1976 | Gingras | 236/47 X |

Primary Examiner—William E. Wayner

Attorney, Agent, or Firm—Andrus, Sceales, Starke & Sawall

[57] ABSTRACT

An ambient room illumination responsive control automatically changes the setting of a thermostat with ambient illumination. A thermostat has a pair of temperature responsive switches connected in series with control leads and a controller to low voltage A.C. power. A bypass relay has contacts connected in parallel with one of said switches. An illuminating sensor has a photoresistor in series with a resistor connected across leads with a common node connected to the gate of a controller rectifier. A capacitor timing unit is connected in one embodiment to produce a pulsed input. The rectifier is connected in series with a winding of the bypass relay and the timing unit across the thermostat leads. The rectifier conducts to open the relay contacts and insert the second switch in circuit. A second relay winding is connected across the control leads in series with a diode and a timing network to reset the relay and close the contacts. The time constants of the two timing circuits where employed insure proper operation of the set and reset branch circuits. A separate remote pulse control may be provided.

20 Claims, 4 Drawing Figures

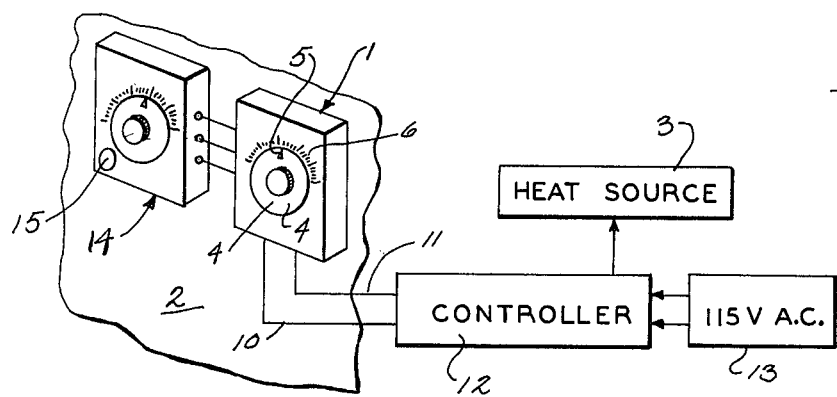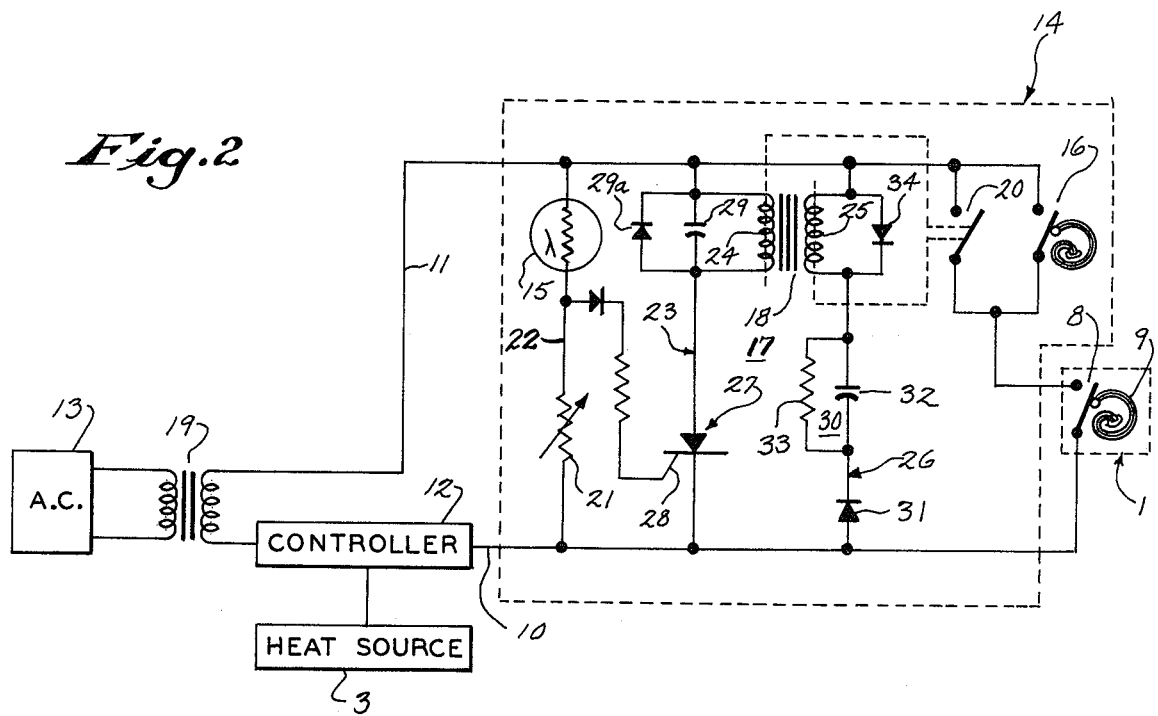

CONDITION RESPONSIVE THERMOSTAT CONTROL APPARATUS

This is a continuation-in-part application of the pending application, Ser. No. 672,747, filed Apr. 1, 1976, now abandoned of Jon C. Wirth.

BACKGROUND OF THE INVENTION

This invention relates to ambient room illumination responsive thermostat control apparatus and particularly to such apparatus for automatically changing the temperature response level of a thermostat for the conventional heating system during predetermined periods of the day.

The various enclosed and inhabited structures such as homes, institutions, commercial buildings and the like, are heated and cooled to create a comfortable temperature.

Generally, thermostatic controls include a temperature-responsive switch element located within a thermostat housing which is constructed to expose the element to the ambient room temperature. Adjustable means permit setting of the response temperature level for actuating the switch at a predetermined, sensed ambient temperature. The switch element opens and closes the connection of a pair of thermostat control leads which run through the wall of the structure directly to a system controller and are connected in series to the control elements.

An adjustable thermostat connected to control the heating and/or cooling system permits the inhabitants to select the temperature desired for comfort. In some installations, a plurality of zone heating systems will be employed with individual thermostats in the several areas for separately controlling the temperature. For example, a home may be conveniently divided into various areas or zones and individually controlled in accordance with the normal usage.

Although the commercially available thermostats are often provided with manually adjusted, temperature setting controls, various automatic devices have also been suggested to affect an automatic adjustement of the temperature setting to eliminate the necessity for manual monitoring of the settings and to provide automatic control in the absence of the personnel. In particular, such devices have been widely employed to affect the automatic setback of temperature during night-time hours when the requirement for heating is significantly reduced.

The interest in such an automatic control device has recently increased as a result of questioning of the availability of energy sources, the cost factors of the available energy and the like. Various methods have, over the years, been suggested. For example, U.S. Pat. No. 1,597,773 disloses a clock-operated unit for providing an automatic temperature setback at a selected night setting in combination with an electrical operator connected in circuit with the lighting system to permit overriding thereof when the lights are turned on.

British Pat. No. 1,005,175, discloses a system which was particularly adapted to a horticultural building and relies on a solar energy responsive device located on the roof structure or the like to control the setting of the mean temperature to be maintained by the heating or cooling means and thereby permit controlling of the conditions within the horticultural glass house. U.S. Pat. No. 3,834,614 discloses a method in which a clock-operated mechanism operates an auxiliary heating source to establish a false heat flow over the normal thermostat unit during the night periods. This auxiliary heat inhibits operation of the heating system unless the normal ambient temperature drops further than can be replaced by the auxiliary heat source.

A more typical commercially available type of system is generally shown in U.S. Pat. No. 3,891,144 which employs a clock-operated day-night switching system. The clock system is driven directly by a series connection to the thermostat control leads with an appropriate circuit employing a coupling resistor provided to maintain continous energization of the clock even though all sensing circuits are open. The resistor of course results in a voltage drop and correspondingly reduces the available voltage to the sytem controller. The control must of course therefore be specially constructed to compensate for such voltage drop; requiring either a special clock, increased voltage or the like to insure a high degree of accuracy.

Although, therefore, many different suggestions have heretofore been developed, there remains a distinct need for a simple, reliable and relatively inexpensive automatic setting change apparatus which can be incorporated into a thermostat control unit with present system specifications for affecting an automatic setback and/or which can be incorporated into an existing installation.

SUMMARY OF THE PRESENT INVENTION

The present invention is particularly directed to a room illumination responsive control apparatus for automatically changing the setting of a thermostat unit. Generally, in accordance with the present invention, an ambient illumination or other condition sensitive circuit means is provided to respond to the ambient light or other condition level in a given room or structure and connected to a switching circuit for automatically controlling the setting of a temperature responsive switch means and/or the connection of various temperature-responsive switch means in the thermostat control leads for directly setting the temperature response point or level in accordance with the ambient light or other condition in the room. When the ambient light drops to or below a predetermined level, the illumination sensitive circuit means establishes one setting. Conversely, when the ambient light rises above such selected, level, the circuit automatically changes to the alternate setting. The two settings may be conveniently referred to as the low-temperature setting and/or the high-temperature setting of the thermostsat. During daylight hours and any time that normal room lighting is present, the high temperature setting is operative. During the night, the low-temperature setting is operable to control and reduce the ambient temperature.

In accordance with a particularly unique aspect of the present invention, the ambient illumination sensing circuit or network is connected directly to the thermostat control leads and uniquely samples the condition of the ambient illumination when the thermostat unit is not demanding an output. The network selectively latches and unlatches a latching switch means for selectively connecting and disconnecting of an auxiliary temperature control into the circuit. The sampling system is such that when a demand exists full signal voltage is supplied to the control system, bypassing and removing power from the ambient illumination sensing network. The latching system in another unique and preferred aspect of this invention includes a pulsed set and a pulsed reset of the switch means. This effectively eliminate any residual power flow in the off or non-demand state and insures release of the main controller. This also permits use of other forms of controlled setback, such as a remote encoded system including a pulse source connected to the setback control circuit at the thermostat.

In accordance with a particular aspect of the present invention, a photosensitive cell means is connected in a sensing branch across a suitable power supply, which may be a separate voltage power supply or which in a unique construction may directly be the thermostat control leads or circuit wires. A triggered or gated solid-state switch means such as a control rectifier or the like has its input connected to the sensing branch. A bistable switch means is connected in series with the triggered switch means to the power supply and controls setting the thermostat temperature responsive switch means. The bistable switch means may selectively bypass or release the connection of the auxiliary temperature responsive switch means into the circuit of the thermostat leads with the normal temperature responsive switch means to provide an overriding control and to establish the desired alternate thermostat setting.

In a preferred construction, the bistable switch means has a separate reset circuit means, and the gated switch means and the reset circuit means are connected across the thermostat leads in series with separate parallel resistive-capacitive circuits. The resistive-capacitive circuits each define a timing or pulse forming circuit with the reset circuit having a substantially shorter time constant than that of the setting circuit. Each timing circuit is reset upon the thermostat closing and demanding an output. When the demand state is removed, the control is placed in a control state in accordance with the last input state or any new input state existing at the time.

More particularly, in accordance with a particularly unique and novel embodiment of the present invention, a sensing branch includes a photosensitive device such as a photoresistor connected in series with an adjustable control resistor directly across the thermostat control leads. A setting branch includes the triggered switch connected in series with a latching relay means, and preferably a timing capacitor means to produce the unique pulsed setting, across the thermostat control leads in parallel with the photosensitive sensing branch. The relay contacts are connected to bypass the auxiliary or night temperature control switch means and maintain response to the normal or day temperature control. The latching relay means includes a first winding means to set the relay contacts and a reset winding to reset the contacts. The set winding is connected in the setting branch to close the contacts. The reset winding means of the latching relay means is connected in a reset branch, which preferably includes a series timing capacitor means to produce a unique pulsed resetting, across the control leads and is operable to reset the latching relay under the alternate or night-time conditions. The relay contacts are then reset and operatively release and connect the auxiliary temperature sensing means into the thermostat control circuit.

During the daylight hours, the photosensitive resistor or element actuates the triggered switch to conduct and latch the relay in a bypass position shorting out the contacts of the night thermostat control element switch means. As darkness occurs, the output of the photoresistor element changes and the triggered switch is not gated on. The reset branch then conducts the alternate cycles of the supply and after a predetermined time actuates the reset winding to reset the latching relay opening of the bypass contacts and introducing of the night responsive, or the low temperature, responsive to the circuit. Even though the normal day temperature response device is closed as the temperature drops the low temperature switch will be maintained open until the temperature drops below the desired night time-setting. When that occurs, the switch closes and completes the circuit to the control leads.

Whenever the thermostat switch or switches connect the control leads, the completed circuit bypasses the sensing network and removes power therefrom and also thereby provides full supply voltage to the system controller.

In accordance with the broadest aspect of this invention, the sensing network means may actuate other types of setback controls such as an auxiliary heat source which is energized in parallel with the other branches to effect override of the normal control, or a means responsive to the illumination responsive network could be incorporated into the system to automatically reposition the thermostatic setting of the normal day switch. Thus, in accordance with the present invention, any means adapted to be driven from a 24-volt supply, or such other supply as employed in the thermostat circuit, may be interconnected to actuate the standard type of a thermostatic unit. The periodic sampling concept permits the continuous control in combination with maintaining the highly desirable full voltage supply to the controller without requiring special design and the like.

The present invention thus provides a simple, reliable and inexpensive control apparatus for controlling the automatic sensing of a thermostatic control unit or the like.

BRIEF DESCRIPTION OF THE DRAWING

The drawing furnished herewith illustrates a preferred construction of the present invention in which the above advantages and features are clearly disclosed, as well as others which will be clear from the following description.

In the drawing:

FIG. 1 is a view of a thermostatic unit located within a room area and connected to a diagrammatically illustrated heating control system;

FIG. 2 is a schematic circuit diagram of a preferred embodiment of an automatic control constructed in accordance with the teaching of the present invention;

DESCRIPTION OF THE ILLUSTRATED EMBODIMENTS

Figure 3:
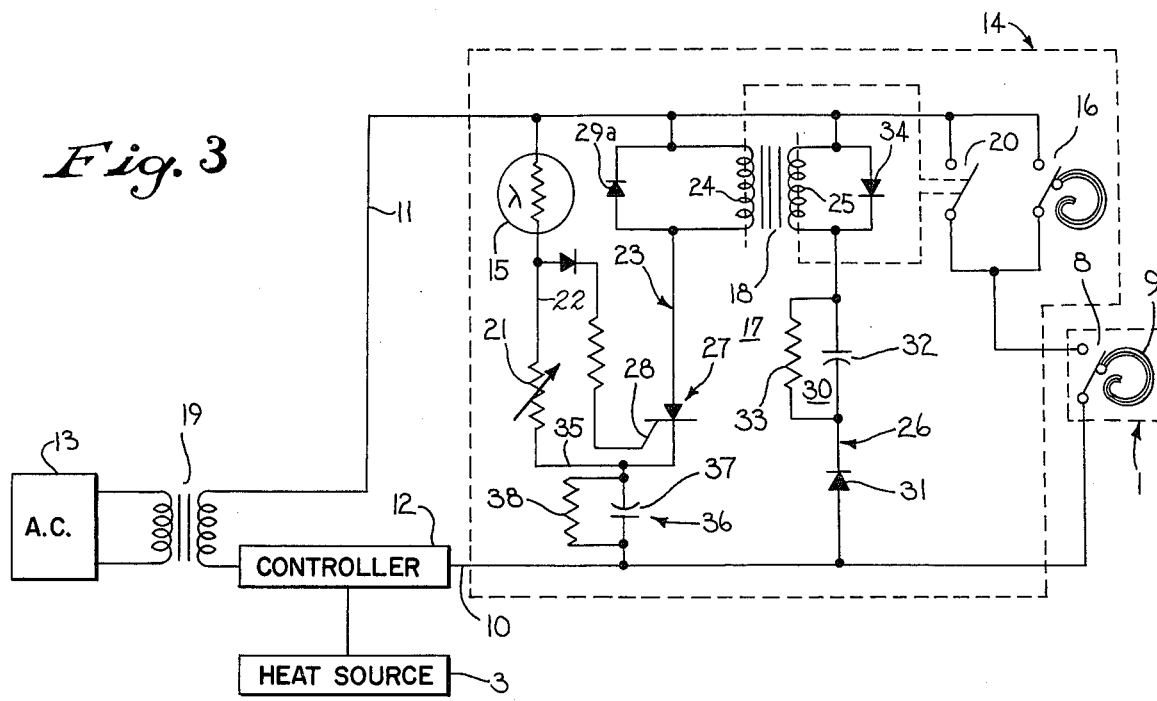
FIG. 3 is a schematic circuit diagram illustrating an alternative embodiment.

Referring to the drawings, and particularly to FIG. 1, a conventional room thermostat unit 1 is shown mounted in a suitable location on an interior wall 2 of a room or the like. The conventional room thermostat 1 controls a heating unit 3 which is operable to maintain the room at a preselected temperature. Typically, the thermostat unit 1 includes an adjustable temperature selection means shown as a rotating disc element 4 with a pointer or indicator 5 moving across a scale 6 to indicate the temperature selected. The thermostat unit 1 of course is apertured or the disc is spaced from the outer housing structure 7 to permit free circulation of ambient room air over any suitable sensor located within the housing.

For example, as shown in FIG. 2, a temperature sensor is shown as a temperature responsive switch means including a switch 8 connected to an expanding spring element 9 which is positioned in accordance with the ambient temperature to open and close the switch 8. The switch 8 is connected in circuit to a pair of low-voltage thermostat control leads 10 and 11 as shown in FIGS. 1 and 2. A system controller 12, of any suitable construction, is connected to leads 10 and 11 and to a main alternating current supply 13 such as the conventional home power distribution system and provides a modulated operation of the heating unit 3 in accordance with the opening and closing of control system leads as a result of opening and closing of the temperature-sensitive or responsive switch 8.

In accordance with the illustrated embodiment of the present invention, shown in FIG. 1, a self-contained light-responsive temperature override control unit 14 is provided and mounted adjacent to the conventional thermostat unit 1. In accordance with the embodiment of the invention as more fully illustrated in FIG. 2, the self-contained control includes an ambient light sensitive means shown as a photoresistor 15 to continuously monitor the ambient room lighting conditions and thereby provide a control signal indicative of the use conditions of the room.

During day light hours, or in the evening or other periods when artificial lighting has been turned on, the normal setting of the thermostat unit 1 is desired to provide a comfortable environment for the personnel using the area. When such lighting conditions do not exist it is a relatively reliable indication that the room area is not being used and that the thermostat unit 1 can be set back to a lower setting. In accordance with the embodiment of the invention as shown in FIGS. 1 and 2, the control unit 14 is connected to the thermostat control lead 10 and 11 and derives its operating power therefrom for actuating of an embodiment light sensitive control network to automatically introduce an alternate temperature responsive switch unit 16 similar to the normal temperature responsive switch unit 8 into the control circuit. An adjustable thermostat setting dial 16a may be provided for adjusting of the night temperature setting under the control of the photosensitive cell 15. The photocell 15 is connected in an illumination responsive network 17 and includes a switching unit 18 for selectively operatively connecting and disconnecting of the switch 16 from the circuit of the control leads 10 and 11.

More particularly and referring to FIG. 2, the control leads 10 and 11 are shown connected to the power supply 13 through a step-down transformer 19 stepped to reduce the incoming voltage to a relatively low voltage. For example, conventional controls use a 24 volt alternating current which is impressed on the thermostat control circuit leads. The temperature responsive day switch 8 is connected in series with the night temperature responsive switch 16 across the thermostat control leads 10 and 11. The switching unit 18 includes bypass contacts 20 connected in parallel with the night temperature responsive switch 16. The bypass contacts 20 are held closed during the daylight or in the presence of normal ambient room illumination, and thereby directly bypass the night switch 16. The system thereby solely responds to the opening and closing of the temperature sensitive switch 8 of the normal thermostat unit 1.

At night, however, the response of the photosensitive cell 15 actuates the circuit 17 to open the bypass switch 20 and thereby introduce the night temperature responsive switch 16. Under this condition, even though the day temperature responsive switch 8 closes, the circuit across the control leads 10 and 11 remains open. Only when the temperature drops to and below the level of the night temperature responsive switch 16 will the circuit across the control leads 10 and 11 close, thereby signalling the controller 12 to actuate the heat source to provide additional heat.

In the illustrated preferred and unique embodiment of the present invention of FIG. 2, the photosensitive cell 15 is shown as a small, well-known photoresistor. The photoresistor 15 in series with an adjustable resistor 21 is connected directly across the thermostat control leads 10 and 11 to form an ambient illumination sensing branch 22 of the network. The output of the sensing branch 22 is connected to control a set circuit branch 23 for setting of the switch unit 18 in a first position. Unit 18 in the illustrated embodiment is shown as a dual winding latching relay means.

The latching relay means may be of any suitable construction and is diagrammatically illustrated including a setting winding 24 which is electromagnetically coupled to close the contacts 20. The closed position is then maintained until a reset winding 25 which is coupled to the contacts 20 is energized. The reset winding 25 is connected in a separate reset branch 26 of network 17. Once reset, of course, the contacts 20 remain open until the set relay winding 24 is again energized. The latching relay means is illustrative of a bistable control and may of course be replaced with any other suitable means such as solid state bistable circuit and the like.

The set branch 23 thus actuates the latching relay 18 to close the bypass contacts 20 during "in use" level ambient illumination as a result of the light provided by natural and/or artificial lighting as follows. The set branch 23 is connected directly to the thermostat control leads and parallel with the sensing branch 22. The reset circuit branch is also connected directly across the thermostat control leads 10 and 11 and is operable to reset the latching relay 18, as follows.

The set branch 23 includes a triggered or gated switch shown as a controlled rectifier 27 in series with the set winding 24 of the relay 18. The gate 28 of the controlled rectifier 27 is connected to the junction of the resistors 15 and 21. The photoresistor 15 has a relatively high resistance level in the absence of illumination and the greater share of the supply voltage across leads 10 and 11 appears across the photoresistor 15. Consequently, the gate 28 which is held at a relatively low potential prevents turn on of the controlled rectifier 27 and effectively maintains the set branch open. During normal in-use period natural and/or artificial lighting create an ambient illumination on the photoresistor 15 which reduces its resistance level and thereby increases the potential at the gate 28.

As previously noted, the power on the thermostat control leads 10 and 11 is an AC power. During the period that the lead 11 connected to the winding 24 and thus to the anode of controlled rectifier 27 is positive, a turn-on signal at the gate 28 causes conduction of the rectifier 27 for that half cycle. During the opposite or relatively negative half cycle, the controlled rectifier 27 is biased off as a result of the reverse bias created by the opposite polarity of the power supply of leads 10 and 11.

In the illustrated embodiment, a holding or smoothing capacitor 29 is connected in parallel with winding 24. Capacitor 29 is charged during the conducting half-cycle of rectifier 27 and discharges during the opposite half cycle to hold winding energized. A protective diode 29a is also connected across winding 24 to prevent creation of damaging voltage rises upon turn off of the set branch 23 and dissipation of the energy stored in winding 24. Consequently, the controlled rectifier 27 turns on each half-cycle and completes the circuit through the set branch 23 and energizes winding 24 to set and close contacts 20.

When the ambient light level decreases and the controlled rectifier turns off, the set winding 24 is de-energized. The bypass contacts 20 however remain in closed position as a result of the last energization of the winding 24. However, the reset branch 26 becomes operative to open the contacts 20 as follows. The reset winding 25 is connected in series with a timed network 30 and a directional diode 31 directly across the thermostat control leads 10 and 11. The illustrated timed network 30 is a well-known R-C circuit and includes a paralleled capacitor 32 and resistor 33. A protective diode 34 is also shown connected in parallel with the winding 25 to discharge inducter energy stored in the winding and prevent creation of damaging voltage conditions.

The diode 31 is connected to conduct the relatively negative half-cycle of the power supply current. The capacitor 32 is therefore charged during each negative half-cycle through the diode 31 and winding 25. The capacitor 32 discharges through resistor 33 during the positive half-cycles and continuously during the period the thermostat is calling for operating of the heating unit 3. A pulse signal is therefore created only when capacitor 32 is essentially discharged and allows current to flow. This creates a pulse of current to the reset winding 25 for opening of contacts 20, but only if winding 24 is not energized.

If winding 24 is energized, the contacts 20 will remain closed as the capacitor 32 rapidly charges. When capacitor 32 is charged, the energization level of the reset winding 25 is reduced such that in the presence of appropriate ambient illumination, the continuously energized set winding 24 holds contacts 20 closed. This system thus energizes the reset winding 25 only for the period immediately following reset of the network 30. This action causes the bypass contacts 20 to open for inserting temperature responsive switch 16 into series circuit with the temperature responsive switch 8 only if the ambient illumination level is such as to hold winding 24 de-energized.

Whenever heat is demanded, the complete network 17 is short circuited or bypassed and the timing network 30 resets.

During periods of relatively low ambient illumination, as selected by setting of variable resistor 21, the set branch 23 is held off. Only branch 26 is energized upon termination of a heating cycle, with a pulsed energization of winding 25 resetting the contacts 20 to the open position.

In summary, in the illustrated embodiment of the invention, the sensing control network 17 and particularly the several branches 22, 23 and 26 are all connected directly across the thermostat control leads 10 and 11. They are, therefore, also directly connected in parallel with the temperature responsive switches 8 and 16 and the interrelated bypass contacts 20. Thus, whenever a demand for heat is present, the parallel temperature responsive switch or switches 8 and 16 and/or the bypass contacts 20 short circuits the sensing network 17 and full supply voltage is maintained to the controller 21. The photosentitive network 17 thus repetitively operatively samples the lighting conditions only during the period that the thermostat unit 1 is not signalling the controller 12 and maintains reliable systems operation.

Although shown as a separate adapter 14, control may of course be incorporated directly within a thermostat housing as an integrated structure. The present invention employs a basically different approach in which a sampling of the illumination conditions occurs when, and only when, the thermostat unit 1 is not otherwise operative in the control system. This permits the connection of the system to the signal thermostat control leads and particularly adapts the invention to the conventional thermostatic control system employing standard and well-known components.

The sampling concept, as a result of not loading the control circuit during the period that it is operating to control the heating, is readily adapted to various other modes of control. For example, the night temperature responsive switch 16 could of course be replaced by a small heating element, not shown, located near the normal thermostat unit and connected in series with the latching relay contacts and parallel with the temperature responsive switch 8. The element would, of course, provide an auxiliary heat source only during the effective night hours, during which period it would cause the thermostat unit 1 to call for heat only when the temperature when added with the auxiliary heat dropped to the level of the normal temperature responsive switch.

Whenever the thermostat contacts 20 closed, the heating element would again be by-passed and provide full control voltage to the controller 12. An electro-mechanical mechanic could also be coupled to the dial setting unit for controlling the setting of the temperature responsive switch of the conventional thermostat. The sampling technique would permit actuation of the mechanism without interferring with the normal operation of the system.

The illustrated circuit provides a pulsed operation for resetting of the control to the setback temperature. The circuit may advantageously be modified to employ a pulsed operation for the setting of the control to a normal or daytime setting. Although the current flow in the sensing circuit is minimal, the inventor has found that the controller may have internal components such as an electrically controlled gas valve which is responsive to the low residual direct current component created by the sensing circuit. If this occurs, the system controller will not release upon opening of the temperature sensitive switches 8 and 16. A total pulsed system may avoid such a condition and may further adapt the system to remote setpoint control. A particularly satisfactory and minor modification to the embodiment of FIG. 2 to establish a totally pulsed control is shown in FIG. 3. The corresponding elements of the two embodiments are identified by corresponding numbers and only the revision of FIG. 3 is described in detail.

In FIG. 3, the sensing branch 22 including sensor 15 and the switching branch 23 are connected to each other by a line 35. A pulse or timing circuit 36, shown as a paralleled capacitor 37 and resistor 38 are connected between the connection line 35 and the output line 10 to controller 12. The capacitor 29 of the embodiment of FIG. 2 is removed.

The paralleled capacitor 37 and resistor 38 are thus in series with both the control or sensing leg 22 and the control leg 23, including the gated switch or control rectifier 27 and the set winding 24. The time constant of circuit 36 is selected to be substantially longer than that of circuit 30. For example, capacitor 32 may be on the order of one microfarad, while capacitor 37 is on the order of ten microfarads. This insures that the branch 23 predominates to hold contacts 20 closed during periods of high illumination.

In the embodiment of FIG. 3, the relay 18 is pulsed both to set and to reset the relay. Thus, to set the circuit, the illuminated sensor 15 produces a signal to gate rectifier 27 on. This produces current to turn-on or set relay 18, with contacts 20 closed. The capacitor 32 charges with successive pulses to essentially the supply value and the current in the branch 23 drops below the holding current of the control rectifier 27. The rectifier thus turns off. The relay 18 is, however, set and contacts 20 are closed. The reset branch 26 is also pulsed on alternate half-cycles, but because of the short time constant charges to the cutoff level to essentially open such branch circuit during the period that branch 23 continues to conduct. Thus, as in the embodiment of FIG. 2, during periods of high ambient illumination, both branches 23 and 26 are energized upon opening of the thermostat switch 8 to also signal termination of the heating cycle to controller 12. However, only the initial or first few cycles are of sufficient level to reset the relay contacts 20 after which the charge on capacitor 32 is such as to allow only minimal current flow in branch 26. However, branch 23 fully conducts and predominates such that the contacts 20 are set and remain set.

The circuit resets generally in the same manner as the circuit of FIG. 2. If the illumination level drops, the signal to gate 28 of the rectifier drops below the turn-on level and branch 23 is held off. Only branch 26 is then energized upon termination of a heating cycle, with a pulsed energization of winding 25 resetting relay 18 and opening contacts 20.

The pulsed system for setting as well as resetting is particularly significant in insuring reliable and positive on-off setting of the control. Thus, a very small current on the order of millamps in the set branch 23 may lock the controller 12 in the actuated position. The pulsed system essentially eliminates or reduces the total current flow to a level below the controller holding level with temperature sensing switches open and thus assures reliable operation.

Figure 4:
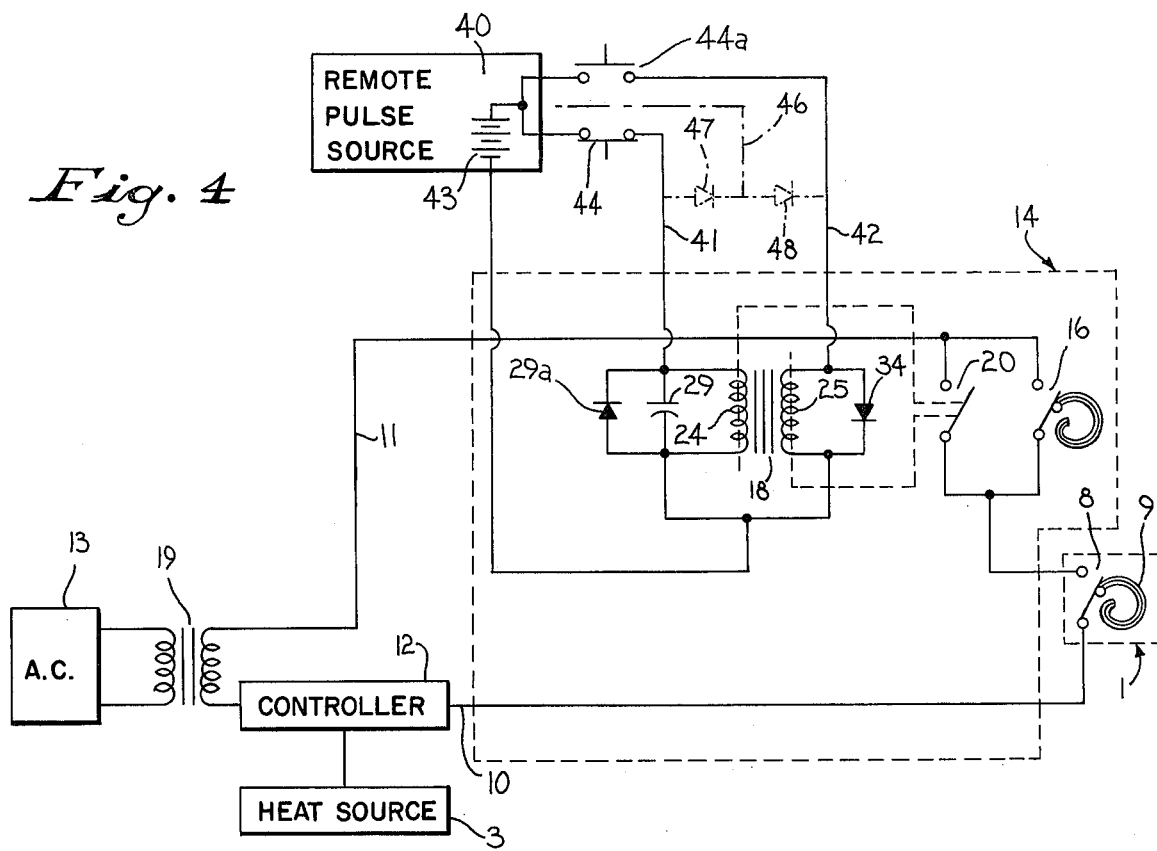
FIG. 4 is a view illustrating an alternate input control.

The pulsed actuation further adapts the control to other forms of remote control, for example, as shown in FIG. 4.

In FIG. 4, the pulsed set-reset system is constructed with a remote pulse source 40 replacing the sensing circuit branches 23 and 26. The pulse source 40 has a first pulse output lead 41 connected directly to winding 24 and a second pulse output lead 42 connected directly to windng 25. The leads 41 and 42 are shown connected to a suitable power source 43 by suitable pushbutton switches 44 and 44a for selectively supplying of pulse signals to the windings. The remote control system could of course employ an encoded local switching means for energizing of the relay windings 24 and 25 in combination with a single input channel, such as the conventional telephone lines. Thus, as shown in phantom, a single signal line 46 may be connected to the windings 24 and 25 in parallel. The branches for windings 24 and 25 each include one of a pair of steering diodes 47 and 48. The diode 47 connected to winding 24 is oppositely polarized with respect to that of the diode 48 connected to winding 25. The appropriate winding is set by impressing an appropiate polarity pulse on the leads 46. Such a system would be particularly adapted for hotels, motels or the like wherein the room setback controls could be selectively controlled using the telephone system.

The construction permits a single, self-contained thermostat with internal setback control or as a separate self-contained control which can be directly interconnected in a very simple manner to the existing control leads of a two-wire thermostat. The present invention thus provides an improved and relatively simple apparatus for controlling the temperature setting of a thermostat during the hours of effective darkness when the premises are not in use or are used only under conditions in which a reduced temperature is not only acceptable but often desirable, such as for sleeping.

Various modes of carrying out the invention are contemplated as being within the scope of the following claims, particularly pointing out and distinctly claiming the subject matter which is regarded as the invention.

I claim:

1. An illumination responsive thermostatic control apparatus for controlling the air temperature in an enclosed area, said control apparatus having a temperature control means mounted on an interior wall, said control means including main and auxiliary temperature sensitive switch means connected in series across a pair of thermostat control leads, said temperature control means having a standby sensing state for sensing of temperature and changing to a demand state in response to a demand temperature level, a light sensitive means connected across said thermostat control leads and mounted within the enclosed area and subjected to ambient area illumination, a circuit control means having an operating means connected in parallel with said light sensitive means and including a trigger switch means responsive to the light sensitive means, and a latching switch means connected to said operating means and having contact means to bypass said auxiliary switch means.

2. In the illumination responsive theremostatic control apparatus of claim 1 said circuit control means being operable to actuate said temperature control means to respond to a different temperature sensitive switch means in response to a selected change in the ambient illumination only when the temperature control means is in a standby sensing state.

3. The illumination responsive thermostatic control apparatus of claim 1 wherein said temperature control means includes a housing, said light sensitive means is mounted to the housing and subjected to the immediately adjacent ambient area illumination.

4. The illumination responsive thermostatic control apparatus of claim 1 wherein said latching switch means is a bistable switch means having a first contact position and a second contact position and having first and second operating elements, the first element being connected to said triggered switch means to respond to said light sensitive means, and having a reset means connected to said second element to reset said latching switch means.

5. The illumination responsive thermostatic control apparatus of claim 4 wherein said leads are connected to alternating current power and said circuit control means is connected to derive alternating current power from said control leads, and said reset means being connected across said leads and including a series connected capacitive timing means and unidirectional conducting means and thereby responding to one half-cycle of the power, said timing means being reset upon creating a demand for temperature conditioning of the air.

6. The control apparatus of claim 5 wherein said trigger switch means is a gated semiconductor switch connected across the control leads in series with the first element and having a gate, a resistor connected in series with said light sensitive means connected across said leads, said gate being connected between the resistor and sensitive means to provide a gated signal from said temperature control means to actuate the gated switch and set said latching switch means.

7. An automatic controller for a thermostat unit having a temperature responsive switch means connected in series with a pair of control leads, comprising an auxiliary temperature sensitive switch means to be connected in series with said temperature responsive switch means, a bypass switch means connected in parallel with said auxiliary temperature sensitive switch means, said bypass switch means including an operating means, a pair of common input-output terminal means adapted to be connected between said control leads, a sensing branch circuit connected between said terminal means and including a light sensitive control means, a switching branch connected between said terminal means and having a gated switch means having a gate means connected to said sensing branch circuit to continuously monitor the ambient illumination and short circuited in response to a demand by the thermostat unit by the temperature sensitive switch means and said bypass switch means.

8. The automatic controller for a thermostat unit of claim 7 wherein said bypass control switch means is a bistable switch means having a first input means to operatively close the switch means and a second input means to open the switch means, said first input means being connected in series with said gated switch means, said second input means being connected to said control leads and including means to restrict the switch opening operation of the second input means during periods said gated switch means is on.

9. The automatic controller of claim 7 wherein said light sensitive control means is a photoresistor means, and said sensing branch circuit includes a fixed resistor in series with said photoresistor means, said gate means being connected to the junction of said photoresistor means and said fixed resistor.

10. The automatic controller of claim 9 wherein said control switch means is a relay means including first and second windings at said first and second inputs.

11. An ambient light responsive thermostatic control apparatus having a pair of temperature sensitive control switch means connected in a series control circuit path with a pair of thermostat control leads, comprising a light sensitive sensing network including a sensing branch connected directly across the thermostat control leads, a bistable switch means having contact means connected in series with said one control switch means and in parallel with the second control switch means, a switch operator means operable to set and to reset said bistable switch means, a gated switch means connected in series with the switch operator across the control leads and having a gate connected to the sensing branch means whereby said sensing network and operator means are operable to sample the status of the illumination only with said series control circuit path open.

12. An automatic controller for a thermostat unit having a main temperature responsive switch means connected in series with a pair of control leads, comprising an auxiliary temperature sensitive switch means to be connected in circuit with said temperature responsive switch means, a bistable control switch means for selectively connecting said auxiliary temperature sensitive switch means in circuit with said temperature sensitive switch means including first and second operating means for operatively opening and closing said switch means, a pulse source means connected to said first operating means and said second operating means for establishing selective pulsed operation of said operating means and preventing loading of said control leads with said temperature sensitive switch means open.

13. The automatic controller of claim 12 wherein said bistable control switch means is a relay means and each of said operating means in a winding coupled to a common contact means connected in circuit with said temperature responsive switch means.

14. The controller of claim 12 wherein said pulse source means include polarity sensitive means of opposite polarity connected to the operating means.

15. A condition responsive thermostatic control apparatus having a pair of temperature sensitive control switch means connected in a series control circuit path with a pair of thermostat control leads connected to an alternating current supply for a controller, comprising a bistable switch means connected in series with said one control switch means and in parallel with the second control switch means, first and second switch operator means operable to set and to reset said bistable switch means, a control switch means, a capacitive timing means connected in series with the first switch operator and said control switch means across the control leads, a condition sensitive sensing network connected to actuate said control switch means and including a sensing device connected in series with said capacitive timing means directly across the thermostat control leads, a second capacitive timing means connected in series with the second operator means across said control leads, said second timing means having a shorter time constant than said first timing means, whereby said sensing network and operator means are operable to sample the status of the condition for actuating said sensing device only with said series control circuit path open.

16. The control apparatus of claim 15 wherein said control switch means is a gated solid state semiconductor element having a gate connected to said sensing network.

17. The control apparatus of claim 15 wherein said bistable control switch means is a relay means and said first and second operator means are first and second windings, diode means connected said windings to said control leads in series with said timing means to respond to opposite polarity half-cycles of the alternating current supply.

18. The control apparatus of claim 15 wherein said capacitive timing means each include a capacitor in parallel with a resistor.

19. The apparatus of claim 18 wherein said second timing means has a time constant about ten time shorter than said first timing means.

20. The control apparatus of claim 15 wherein said sensing device is a light sensitive impedance element in series with a voltage dividing impedance element with a signal node therebetween and said control switch means is a gated solid state semiconductor element having a gate connected to said signal node, each of said capacitive timing means includes a capacitor in parallel with a resistor, said second timing means having a time constant about ten times shorter than said first timing means, said bistable control switch means is a relay means and said first and second operator means are first and second windings, diode means connect said windings to said control leads in series with said timing means to respond to opposite polarity half-cycles of the alternating current supply.

* * * * *